June 5, 1951
E. B. HALES
2,555,442
RADAR TRAINER
Filed Aug. 6, 1949
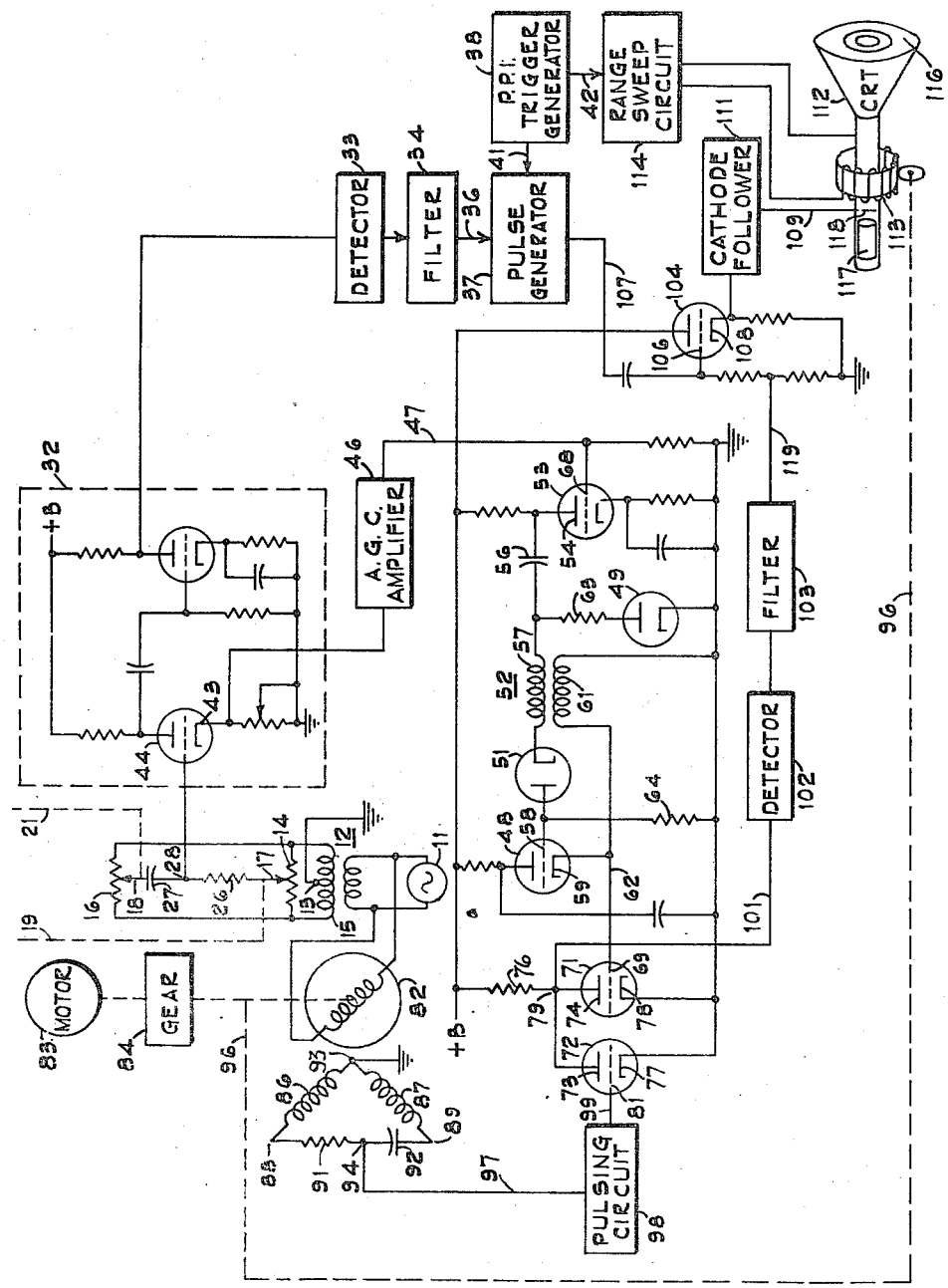
Inventor
EVERETT B. HALES
By
H. A. Mackey
Attorney Patented June 5, 1951

2,555,442

UNITED STATES PATENT OFFICE 2,555,442

RADAR TRAINER

Everett B. Hales, Mount Kisco, N. Y., assignor to General Precision Laboratory Incorporated, a corporation of New York Application August 6, 1949, Serial No. 108,900

8 Claims. (Cl. 35—10.4)

This invention relates to a radar trainer wherein real or simulated input data in a form suitable for manipulation is converted to another form more suitable for presentation on radar display equipment.

In training radar operators in the use of equipment which they will be later required to operate under actual conditions, it is essential that the training equipment simulate as nearly as possible those types of display which occur in real operations. For example, if it is desired to train operators of radar apparatus for spotting airplanes, the training equipment is required to simulate the display of a number of moving target airplanes, frequently on displays located at a number of different points.

The input data which is representative of the various airplane positions is more conveniently generated in terms of rectangular coordinates of position since change of position may then be accomplished by simple algebraic additions of the two rectangular coordinates. On the other hand the display of the data on various forms of radar display equipment, as for example, a plan position indicator requires that the data presented thereto be in the form of polar coordinates.

One of the purposes of the instant invention, therefore, is to provide a system wherein input position data represented by rectangular coordinate values is converted to output data represented by polar coordinate values of the same position.

If a radar trainer of this nature is to simulate actual observable conditions it is essential that in addition to merely simulating the positions of various movable targets, there must also be a simulation representing the scanning of the radar antenna.

Another purpose of the invention, therefore, resides in the provision of means to generate data representative of such antenna rotation.

In accomplishing these purposes the instant invention converts mechanical displacements representative of rectangular coordinates of position to electrical potentials representative of similar coordinates. These potentials are in turn converted by suitable circuit elements to an electrical quantity whose potential is representative of range and whose phase displacement is representative of azimuth thus accomplishing the conversion from rectangular to polar coordinates. Through suitable detection circuits the magnitude and phase angle of the converted potential are then utilized to produce the desired polar display.

The action of converting rectangular coordinate data to polar coordinate data is that of an analogue computer and hence while the description refers to its use in a radar trainer for purposes of explanation it will be appreciated that the same system may be applied to other uses as for example, fire control, target identification and the like.

Aside from merely simulating position, the instant invention as heretofore indicated likewise contemplates the simulation of radar antenna scanning. To this end the rotation of a radar antenna is mechanically simulated and converted to a suitable electrical potential whose phase varies in accordance with the mechanical rotation. By providing suitable coincidence circuits operated both by the varying phase signal simulating antenna rotation and the signal simulating target position, intensifying signals are applied to the plan position indicator display only at such times as the antenna would be aligned therewith in actual practice thus simulating and reproducing visual conditions as they would actually occur.

The exact nature of this invention will be more clearly understood from a consideration of the following description taken together with the attached drawing, in which the single figure of the drawing is a schematic diagram of a system incorporating the invention.

Referring now to the figure, a generator 11 supplies single-phase alternating potential having a frequency in the audio region to a transformer 12, the secondary winding 15 of which is provided with a grounded center tap 13. The secondary winding 15 supplies potential in phase to two voltage dividers 14 and 16, having sliders 17 and 18 mechanically operated by two input data shafts 19 and 21.

These input shafts 19 and 21 are operable by any desired means to supply input data representing the rectangular coordinates of the position of a target and act to displace the sliders 17 and 18 from their center positions by distances proportional to the coordinate magnitudes. Since the voltage dividers are excited in parallel by a potential derived from the winding 15, their sliders assume potentials referred to that of their mid-points which are algebraically proportional to the magnitudes of the mechanical input data.

These two potentials representing rectangular coordinate values of a target position are converted to a potential and a phase angle representing the polar coordinates of the same target position by a quadrature addition circuit consisting of a resistor 26 and condenser 27 in series. The input of this quadrature addition circuit consists of the potential between the two sliders 17 and 18 and the output is derived from the junction 28 of the resistor 26 and condenser 27 and the center tap 13 of the transformer secondary winding 15.

The relative values of the resistor 26 and condenser 27 are adjusted such that $\omega RC = 1$, R being the resistance of resistor 26, C the capacity of condenser 27 and $\omega$ the frequency $f$ of the supply source 11 expressed in radians per second, i. e. $\omega = 2\pi f$. Under these circumstances as explained more fully in the copending application of Everett B. Hales Serial Number 3652 filed January 21, 1948 the alternating potential obtained between the junctions 13 and 28 has a magnitude equivalent to the quadrature vector sum of the potentials existing at sliders 17 and 18 and has a phase angle equivalent to the phase angle of that vector sum. Actually if E represents the quadrature vector sum of the potentials of sliders 17 and 18 and $\theta$ the phase angle, the output voltage $E_0$ obtained at the terminal 13, 28 has a magnitude $$E_0 = \frac{E}{\sqrt{2}}$$

and a phase angle $\theta$ equal to $\theta - 45°$. Since, however, scale magnitudes and zero positions can be easily adjusted in a plan position indicator, the fact that the output potential differs by a constant amount in magnitude and phase angle from the quadrature vector sum is of no moment. What is of importance is that the input in rectangular coordinates of the position of a simulated target expressed in movement of the sliders 17 and 18 and hence the potentials at these points has been converted to a single potential representative of polar coordinates whose magnitude is proportional to the range of the simulated target and whose phase angle is representative of the azimuth of such target.

The voltage magnitude $E_0$ of the potential between the junctions 13 and 28 is amplified in an amplifier 32, then applied to an infinite impedance triode detector 33, followed by a filter 34 to remove alternating components, so that the output energy of the latter consists of direct current in conductor 36 having a potential representative of the magnitude of the alternating potential $E_0$ and therefore of the polar coordinate range $r$.

The pulse generator 37 may be any of the well-known circuits for producing a linear time delay proportional to the magnitude of a direct current potential. This delay circuit is actuated by a sharp pulse from a plan position indicator trigger generator 38 which for instance, may start the development of a sawtooth potential in the pulse generator 37. This sawtooth potential attains a magnitude determined by the magnitude of the direct current potential in the conductor 36 at which time it is terminated, producing a strong output pulse. For this purpose a generator of the type disclosed in copending application Serial No. 773,061 filed September 9, 1947 by Clarke M. Gilbert entitled Pulse Generator and assigned to the same assignee as the instant application may be used to advantage. The output pulse marks the end of a time proportional to the range $r$, and is employed to actuate a gating tube 104.

The plan position indicator (PPI) trigger generator 38 may be that of an actual radar employed to initiate each sweep or as here illustrated it may be a trigger generator similarly constructed and for the same purpose but constituting part of a cathode ray tube simulator. The output trigger of the generator 38 initiates the delay in the delay circuit 37 through the conductor 41 and at the same time initiates the range sweep in a simulated plan position indicator range sweep circuit 114 through conductor 42.

In order that the phase angle of the potential $E_0$ may be isolated so that the plan position indicator display may be gated at the proper azimuth angle, the cathode 43 of the tube 44 is connected to an automatic gain control amplifier 46. The amplifier 46 may be of conventional design, it being required only that its output be of substantially sinusoidal form having a phase representative of the phase of the input but of substantially constant amplitude regardless of changes in input amplitude, so that changes in magnitude of the potential $E_0$ do not have any effect on the circuits which are to be actuated by its phase angle alone.

The output of the amplifier 46 is impressed on a pulsing circuit of an improved multiar type, consisting of the triode 48, diodes 49 and 51 and transformer 52, through the conductor 47 and amplifier tube 53 the input of which is connected to the conductor 47 and the output of which is connected to the aforementioned pulsing circuit.

The substantially sinusoidal output potential of the amplifier 53 derived from the anode 54 through a large coupling condenser 56 is applied through the secondary winding 57 of the transformer 52 and the diode 51 to the control grid 58 of the triode 48. The cathode 59 of triode 48 is connected to ground through the primary winding 61 of the transformer 52, and an output conductor 62 is connected to the cathode 59 for supplying appropriate pulse signals to succeeding circuits. The output plate of the coupling condenser 56 is connected to ground through a resistor 63 and the diode 49, and the grid 58 of the triode 48 is grounded through a resistor 64 equal in resistance to that of resistor 63.

The triode 48 is arranged so that in the absence of an input signal full rated anode current flows. In the application of an input signal to this triode, diode 51 is poled to interpose an open circuit in the path of the signal during its positive half cycles, becoming conductive at or very soon after the time when the negative half cycle commences. At this instant therefore the grid 58 is made more negative with respect to its cathode 59, tending to reduce the anode current flow and tending to make the cathode somewhat more negative. This reduction of current in the cathode circuit induces a potential through the primary winding 61 in the transformer secondary winding 57 of such polarity as to increase the negative potential of the grid 58, so that the effects are cumulative and the grid is thereby violently driven negative beyond cut-off and the triode anode current ceases. This action occurs immediately after the signal wave crosses its axis and is completed in perhaps a small fraction of a microsecond, so that if the axis of the incoming signal is well-defined the timing of the front of this pulse is exceedingly definite. The potential of the cathode 59 having been driven below zero, now increases to zero or ground potential under control of circuit time constants, and the grid 58 becomes less negative under control of the input signal. Finally the negative bias becomes small enough so that anode current again begins to flow, when a similar regenerative action through the transformer 52 in the reverse sense causes a positive pulse at the cathode 59. This positive pulse is much less definite in time than the negative pulse, so that the front edge of the latter is utilized through conductor 62 to actuate a following coincidence circuit.

The diode 49 and its associated resistor 63 together with the diode 51 and resistor 64 are symmetrically placed with respect to the incoming signal and serve as clippers. Since charges flowing into the output side of the condenser 56 must equal charges flowing out of it, it is obvious that equal amounts must be clipped from positive and negative half cycles so that the effective axis for operation of the triode 48 is maintained accurately at a particular potential level with the result that the timing of the output pulse is independent of signal potential magnitude.

In the design of this circuit it is necessary for the number of turns in transformer secondary winding 57 to be greater than the number in the primary winding 61, to secure proper regenerative action. In the embodiment herein described it is preferred to employ diodes as the rectifiers 49 and 51. However, crystal rectifiers can be substituted therefor with appropriate changes in circuit constants to attain similar if not equally good results.

The output pulses of this circuit are conducted through conductor 62 to the control grid 69 of a triode 71 which together with triode 72 forms a Rossi coincidence circuit. The triode anodes 73 and 74 are connected together and through a plate resistor 76 to a source of positive potential, and the cathodes 77 and 78 are connected together and to ground. The bias conditions permit a large anode current flow in the absence of any input signal, and the output terminal 79 at the anodes is nearly at ground potential, say +20 volts. Under these conditions positive pulses on the grid 69 cannot change the plate potential appreciably. Also, by making only one of the two grids negative and cutting off the current flow in that tube, as by the reception at the grid 69 of a negative pulse, the potential at the junction 79 is raised but little, to say 25 volts. However, if negative pulses are simultaneously received by both grids 69 and 81, both tube currents are cut off and the potential of the junction 79 rises to approximately the +B source value.

An antenna simulator is provided to produce a constant alternating potential having the frequency of the generator 11 and having a continuously and linearly changing phase at a rate of one revolution of 360 electrical degrees in four seconds, simulating a mechanical rotation at the same rate of a radar antenna. The antenna simulator also may be employed to mix simulated radar signals with actual radar signals on the same plan position indicator screen. The simulator has a rotor 82 carrying a single winding and rotated by a motor 83 through a speed reducing gear 84 to simulate the rotation of a radar antenna, or it may be rotated by the operating mechanism of a radar antenna if the simulated signals are to be mixed with actual radar signals. The rotor 82 is energized electrically by the generator 11, and two stator windings 86 and 87 in spatial quadrature relation are inductively excited from the rotor. Each of the windings 86 and 87 has a potential induced in it by the rotor winding and these two potentials will be, if each voltage turn ratio is 1 to 1, E sin $\theta$ and E cos $\theta$, E being the potential across the rotor winding and $\theta$ being the rotor displacement angle. These two potentials are in series across the terminals 88 and 89, so that they are applied to the series circuit consisting of the resistor 91 and condenser 92.

The resistor 91 and condenser 92 like the resistor 26 and condenser 27 previously referred to have values such that $\omega CR = 1$ and hence this circuit constitutes a quadrature addition circuit functioning in a manner similar to the series circuit composed of the resistor 26 and condenser 27 as heretofore described. Of course the quadrature vector sum of the voltages E sin $\theta$ and E cos $\theta$ induced in the coils 86 and 87 is always equal to E so that the magnitude of the potential obtained at the junctions 93 and 94 does not vary. The electrical phase angle of the potential, however is constantly varied and is at all times exactly proportional to the mechanical phase angle of the rotor 82, referred to the phase of the supply voltage as a base. The potential between the junctions 93 and 94 is applied through conductor 97 to a pulsing circuit 98 which is identical with the pulsing circuit composed of tubes 48, 49 and 51 heretofore described, and therefore is represented only by a rectangle for the sake of simplicity of illustration.

The physical rotation of the rotor 82 is also applied through the shaft 96 to a plan position indicator or an instrument simulating it to rotate the cathode ray beam of the instrument as it would be by a radar antenna.

The pulsing circuit 98 generates pulses which are applied through conductor 99 to the grid 81 of the coincidence circuit triode 72. As before described, when this circuit is simultaneously energized by negative pulses on both grids 69 and 81, a positive signal is generated at the anode terminal 79. This positive signal is transmitted by conductor 101 to a detector 102, where it is converted to a direct-current potential of longer duration, any higher frequency components being removed by the filter 103. The resulting direct-current potential is employed as the grid bias of a gating triode 104. The grid 106 of this tube is energized through conductor 107 by the output energy of the pulse generator 37, so that if the grid bias is made sufficiently positive by the coincidence tube output pulse, the pulse generator will cause a large increase in the anode current of tube 104 which will transmit a positive pulse from its cathode 108 through conductor 109 to the intensifying electrode of the plan position indicator. A cathode follower 111 may be interposed in the conductor 109 to lower the output impedance.

An actual or simulated radar scope of the plan position indicator type is indicated by the tube 112. This tube has a single pair of magnetic deflection coils 113 electrically actuated by the sweep circuit 114 to produce rapid periodic radial sweeps of a cathode ray on the screen 116. The pair of coils 113 is mechanically rotated by the antenna simulator motor 83 through the mechanical connection 96, so that the radius of sweep is rotated on the viewing screen synchronously with the antenna azimuth rotation. The sweep intensity, however, is normally so low as not to be visible. The tube includes a cathode ray gun 117 having a control or intensifying electrode 118. The latter is energized by pulses through the conductor 109 representing target position when the target position range represented by the pulse in conductor 107 coincides with the antenna rotation time and target position azimuth represented by the pulse in conductor 119. The effect is to increase the intensity of the cathode ray so that it becomes visible to produce momentarily a bright spot on the screen 116. This spot remains visible for a time between antenna revolutions because of the fluorescent screen persistence, and represents by its position and movement on the screen the position and movement of the target airplane.

What is claimed is:

1. A radar trainer comprising, means for converting a pair of alternating current potentials representative of the rectangular coordinates of position of a target to a single alternating current potential having a magnitude and phase angle representative of the quadrature vector sum of said pair of potentials, a first pulse generator operative by the magnitude of said single alternating current potential generating a first pulse signal whose time of occurrence is dependent on the magnitude of said single alternating current potential, a second pulse generator operative by the phase angle of said single alternating current signal generating a second pulse signal whose time of occurrence depends on the phase angle of said single alternating current potential, a cathode ray display tube including means for scanning the beam thereof over its screen in predetermined timed relation and gating means operative conjointly by said first and second pulse signals for intensifying the beam of said cathode ray display tube.

2. A radar trainer comprising, means for converting a pair of alternating current potentials representative of the rectangular coordinates of position of a target to a single alternating current potential having a magnitude and phase angle representative of the quadrature vector sum of said pair of potentials, a cathode ray tube including deflection means for scanning the beam thereof across the screen of said tube in a successive series of radial and circumferentially displaced lines, means for generating a first signal whose time of occurrence depends on the magnitude of said single alternating current potential, means for generating a second signal whose time of occurrence depends on the phase angle of said single alternating current potential and means operative conjointly by said first and second signals for intensifying the beam of said cathode ray tube.

3. A radar trainer comprising, means for converting a pair of alternating current potentials representative of the rectangular coordinates of position of a target to a single alternating current potential having a magnitude and phase angle representative of the quadrature vector sum of said pair of potentials, a cathode ray tube, first deflecting means therefor for deflecting the cathode ray tube beam radially of the screen thereof, second deflecting means for successively and rotatably displacing said radial deflection, means operative conjointly by said radial deflection means and the magnitude of said single alternating current potential for generating a first signal whose time of occurrence depends on the relative magnitude of said single alternating current signal and the radial position of said cathode ray beam, means for generating a second signal whose time of occurrence depends on the phase angle of said single alternating potential and means operative conjointly by said first and second signals for intensifying the beam of said cathode ray tube.

4. A radar trainer comprising, means for converting a pair of alternating current potentials representative of rectangular coordinates of position of a target to a single alternating current having a magnitude and phase angle representative of the quadrature vector sum of said pair of potentials, a cathode ray tube, first deflection means therefor for deflecting the cathode ray tube beam radially of the screen thereof, second deflecting means for rotatably displacing said radial deflection, means operative in synchronism with the rotational displacement of said second deflecting means for producing an alternating current having a constantly varying phase proportional to said rotational displacement, means operative by the instantaneous phase coincidence of said constantly varying phase alternating current and said single alternating current potential for producing a first pulse signal, means for generating a second pulse signal whose time of occurrence depends on the magnitude of said single alternating current signal and means operative conjointly by said first and second pulse signals for intensifying the beam of said cathode ray tube.

5. A radar trainer comprising means for converting a pair of alternating current potentials representative of rectangular coordinates of position of a target to a single alternating current having a magnitude and phase angle representative of the quadrature vector sum of said pair of potentials, a cathode ray tube, first deflection means therefor for deflecting the cathode ray tube beam radially of the screen thereof, second deflecting means for rotatably displacing said radial deflection, means operative conjointly by said radial deflection means and the magnitude of said single alternating current potential for generating a first pulse signal whose time of occurrence depends on the relative magnitude of said single alternating current potential and the radial position of said cathode ray beam, means operative in synchronism with the rotational displacement of said second deflecting means for producing an alternating current having a constantly varying phase proportional to said rotational displacement, means operative by the instantaneous phase coincidence of said constantly varying phase alternating current and said single alternating current potential for producing a second pulse signal, and means operative conjointly by said first and second pulse signals for intensifying the beam of said cathode ray tube.

6. A radar trainer comprising, an alternating current source, means energized thereby for producing a pair of alternating current potentials whose magnitudes are representative of the respective rectangular coordinates of position of a target, circuit means for converting said pair of alternating current potentials to a single alternating current potential whose magnitude and phase angle are representative of corresponding polar coordinates of the position of said target, a cathode ray tube, first deflecting means for deflecting the cathode ray tube beam radially of the screen thereof, second deflecting means for successively and rotatably displacing said radial deflection, a phase shifter energized by said alternating current source and rotated in synchronism with the rotational displacement of said cathode ray tube beam producing an alternating current whose phase constantly varies in accordance with the rotational displacement of said cathode ray tube beam, means for generating first pulse signals whose time of occurrence depends on the instantaneous phase displacement of said constantly phase varied alternating current, means for generating second pulse signals whose time of occurrence depends on the phase of said single alternating current potential, a coincidence circuit operative only by concurrent first and second pulse signals to produce a third signal, means for producing fourth pulse signals whose time of occurrence depend on the magnitude of said single alternating current potential and gating means operative conjointly by said third signal and fourth pulse signals for intensifying the beam of said cathode ray tube.

7. A radar trainer comprising, an alternating current source, means energized thereby for producing a pair of alternating current potentials whose magnitudes are representative of the respective rectangular coordinates of position of a target, circuit means for converting said pair of alternating current potentials to a single alternating current whose magnitude and phase angle are representative of corresponding polar coordinates of the position of said target, a cathode ray tube, first deflecting means for deflecting the cathode ray tube beam radially of the screen thereof, second deflecting means for successively and rotatably displacing said radial deflection, means operative conjointly by said radial deflection means and the magnitude of said single alternating current potential for generating a first pulse signal whose time of occurrence depends on the relative magnitude of said single alternating current potential and the radial position of said cathode ray tube beam, a phase shifter energized by said alternating current source and rotated in synchronism with the rotational displacement of said cathode ray tube beam producing an alternating current whose phase constantly varies in accordance with the rotational displacement of said cathode ray tube beam, means for generating second pulse signals whose time of occurrence depends on the instantaneous phase displacement of said constantly phase varied alternating current, means for generating third pulse signals whose time of occurrence depends on the phase of said single alternating current potential, a coincidence circuit operative only by concurrent second and third pulse signals to produce a fourth pulse signal and gating means operative conjointly by said first and fourth pulse signals for intensifying the beam of said cathode ray tube.

8. A radar trainer comprising, an alternating current source, a pair of potentiometers connected in shunt thereto forming a bridge circuit, a slider on each of said potentiometers operable in accordance with a desired input to produce a pair of alternating current potentials whose magnitudes are representative of the respective rectangular coordinates of position of a target, a circuit interconnecting said sliders comprising a series connected resistor and condenser having such relative values that their product multiplied by the frequency of the alternating source in radians per second is equal to unity, an output circuit connected to the junction of said resistor and condenser for deriving a single alternating current from said bridge circuit whose magnitude is equivalent to the range of said target and whose phase angle is equivalent to the azimuth thereof, a detector operative by a portion of said single alternating current producing a direct current whose magnitude is equivalent to the magnitude of said single alternating current, a cathode ray tube including a first deflecting means for deflecting the electron beam thereof radially of the screen of said cathode ray tube, a sweep circuit energizing said first deflecting means, a pulse generator means energized conjointly by said sweep circuit and said direct current producing a first pulse signal whose time of occurrence with respect to the position of said radial deflection of said electron beam is dependent on the magnitude of said direct current, a limiting amplifier operative by a second portion of said single alternating current for producing an alternating current of a phase equivalent to said single alternating current but of substantially constant magnitude, a first pulsing circuit operative by said last mentioned alternating current producing second pulse signals whose time of occurrence depends on the relative phase of said last mentioned alternating current, a second deflecting means for said cathode ray tube for rotatably displacing the radial deflection of said electron beam, a phase shifter energized by said alternating current source, means for rotating said phase shifter in synchronism with the rotatable displacement of said electron beam whereby a variable phase alternating current is produced whose instantaneous phase depends on the circumferential position of said electron beam, a second pulsing circuit operative by said variable phase alternating current producing third pulse signals whose time of occurrence depends on the instantaneous phase of said variable phase alternating current, a coincidence circuit operated only by concurrent occurrence of said second and third pulse signals for producing a fourth pulse signal, and a gating circuit operative by the conjoint occurrence of said first and fourth pulse signals having its output connected to an intensifying electrode of said cathode ray tube.

EVERETT B. HALES.

REFERENCES CITED

The following references are of record in the file of this patent:

UNITED STATES PATENTS

| Number | Name | Date |
| --- | --- | --- |
| 2,178,074 | Jakel | Oct. 31, 1939 |
| 2,339,661 | Bowie | May 7, 1946 |
| 2,416,088 | Deerhake | Feb. 18, 1947 |
| 2,438,888 | Andrews | Apr. 6, 1948 |
| 2,438,940 | Pennoyer | Apr. 6, 1948 |
| 2,442,351 | Fritschi | June 1, 1948 |
| 2,447,517 | Manson | Aug. 24, 1948 |
| 2,453,743 | Cesareo | Nov. 16, 1948 |
| 2,471,315 | Dehmel | May 24, 1949 |